Jan. 21, 1969  A. J. SEVENCO  3,423,564
ELECTRIC ARC WELDING APPARATUS
Filed June 28, 1965

INVENTOR
Alexander gura Sevenco
By
Watson, Cole, Grindle & Watson
ATTORNEYS

United States Patent Office 3,423,564
Patented Jan. 21, 1969

3,423,564
ELECTRIC ARC WELDING APPARATUS
Alexander Jura Sevenco, Welwyn Garden City, England, assignor to Lincoln Electric Company Limited, Welwyn Garden City, England, a company of Great Britain
Filed June 28, 1965, Ser. No. 467,448
Claims priority, application Great Britain, July 14, 1964, 28,907/64
U.S. Cl. 219—131  8 Claims
Int. Cl. B23k 9/10

ABSTRACT OF THE DISCLOSURE

Apparatus for controlling the droplet rate and frequency of dip transfer for a given rate of feed of electrode wire from a welding head. Flux reset transductors alter the impedance of the welding circuit and include feedback windings to reduce the flux density of the transductor core in accordance with the magnitude of current in the welding head. Adjustable control circuitry is provided for varying the bias flux density to provide a maximum current output subsequent to a short circuit condition of the welding head.

---

The invention relates to apparatus for use in electric arc welding and in particular in dip transfer welding, i.e., a welding process in which a consumable electrode is continuously fed to the work and the operation is carried on in a repetitive cycle in which the electrode first contacts the work—or dips into a weld pool—thereby producing an electrical short circuit with a high current which melts off the end of the electrode forming, it is believed, a droplet which is transferred to the work accompanied by the formation of an arc between the electrode and the work, the arc continuing until the electrode is again advanced into contact with the work or weld pool. The frequency of the cycle is known as the droplet rate. The arc may be shielded by a suitable gas, such as argon, helium or carbon dioxide, or gas mixtures.

As there are two substantially distinct periods of the cycle (the period of short circuit and the period of arcing) and as the electrical resistance between the electrode and work is very different in the two periods, the welding current varies in a cycle with two substantially distinct periods, i.e., the periods of short circuit current and arc current.

The present invention in one of its forms provides welding apparatus for use in dip transfer welding and having means for supplying welding current to a welding head in which there is means (preferably adjustable) to vary one or more of the characteristics (e.g., rate of change of current or the current magnitude) of either one of the short circuit current or the arcing current in preference to the characteristics of the other current.

In a preferred form there are means to control characteristics of both the arcing current and the short circuiting current independently of one another.

It is within the invention to vary a part of the curve of current rise or fall in one or other of the two periods independently of another part of the curve.

In one arrangement according to the invention the control is effected by changing the impedance of the welding circuit during a part of the welding cycle, the impedance reverting very quickly to a preselected value during the remainder of the cycle. In another arrangement the control is effected by injecting a current pulse into the main welding current during a part of the cycle (e.g., near the end of the short circuit period).

The changes in impedance or the pulse injection may be effected in dependence upon changes in resistance at the weld or independently thereof.

Owing to the high frequency of operation, it is preferable to use fast-acting electrical rather than mechanical switching for changing impedance or injecting the pulses. For changing impedance rapidly during the cycle, a flux reset transductor type of saturable reactor may be used. Such a device comprises a magnetic iron loop with one load winding and one reset control winding. Additional control windings may also be used. In one mode of operation each of the load and reset windings has a half wave rectifier in the circuit which limits the current flow to one direction only during every cycle of supply frequency. Each winding and half wave rectifier circuit has an applied A.C. voltage, the two applied voltages being in antiphase and in opposition. Current is allowed to flow in the reset winding during one half cycle of supply frequency only. The reset ampere turns determine the flux density and therefore voltage drop across the load winding during the following half cycle of supply frequency when load welding current flows, the currents in each circuit being limited by their respective circuit impedances.

As an alternative to the use of flux reset transductors, thyristors may be used.

Welding apparatus according to the invention has various practical advantages. For example if the control is made adjustable, the apparatus can become particularly versatile and can be employed either to produce similar welds under different conditions (e.g., using electrodes of different composition) or to vary the welds produced, e.g., weld penetration and shape. In particular by controlling the rate of rise of the short circuit current, the time in which the necessary energy is supplied to melt the wire can be varied. A steep rise or current pulse will cause the rate of energy input to increase rapidly and can be used to control the droplet rate and increase the stability of droplet frequency. The control of current during the arcing period for a given rate of electrode feed enables the energy input to the work piece to be varied, thus giving control of penetration and fusion zone width.

The invention and some examples thereof will now be further described with reference to the drawings in which.

Figure 1:
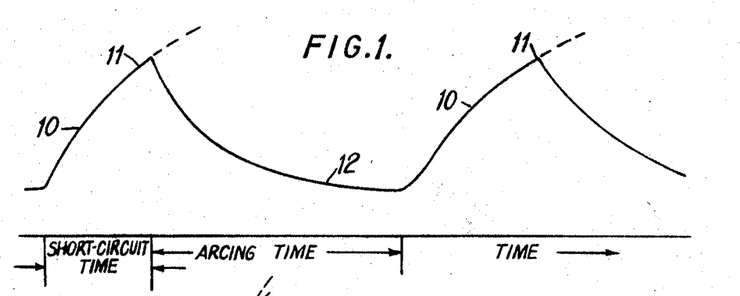
FIGURE 1 is a current-time curve for a conventional welding cycle.

FIGURE 1 shows diagrammatically a typical time-current curve for a direct current welding circuit when used in dip transfer in gas-shielded arc welding. The upward curve 10 represents the short circuit current produced when the electrode touches the workpiece, the point 11 is the point where the electrode melts and an arc is formed, and the downward curve 12 represents the arcing current is the electrode wire tip again approaches the workpiece.

The shape of the curve can be controlled to some extent by varying the value of the characteristic inductance of the circuit but such control affects all parts of the curve at the same time.

Figure 2:
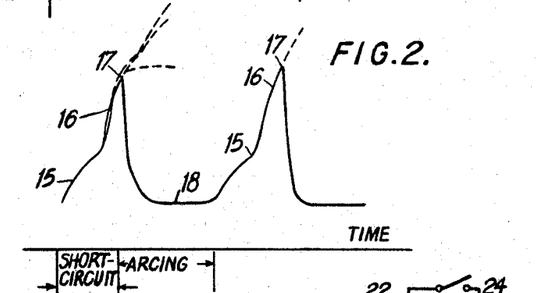
FIGURE 2 is a current-time curve according to the invention.

FIGURE 2 shows a curve which differs considerably from the curve of FIGURE 1 and cannot be obtained at will using conventional equipment. To begin with, the short circuit current rises as does the curve 10 in a curve 15 but the current then rises rapidly in a curve 16 to a point 17 where the electrode melts. The current then decreases very sharply and the arcing current reaches a substantially constant value as shown by the line 18.

The curve of FIGURE 2 has desirable properties which include:

(i) A sharp rise in the short circuit current towards the end of the short circuit period so that a relatively large difference in the current value when the electrode melts will produce a relatively small change in the time at which the electrode melts.

(ii) An arcing current of controlled wave shape.

It is desirable that the shape of the short circuit current curve and that of the arcing current curve should be capable of being varied independently of one another, to enable the correct characteristics to be selected for consumable electrodes of different composition or properties. When different types of consumable electrodes are used with conventional power sources the resultant welds may differ in appearance due to differences in the welding and transfer properties. However, if the characteristics of the power source can be varied to suit the consumable electrodes being used, then welds of similar appearance may be obtained.

Figure 3:
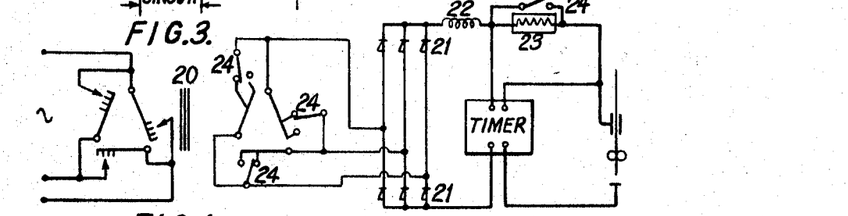
FIGURE 3 shows diagrammatically a first welding circuit.
Figure 4:
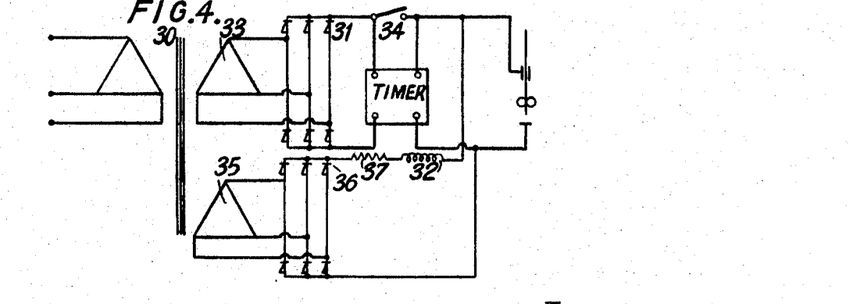
FIGURE 4 shows diagrammatically a second welding circuit.

FIGURES 3 and 4 show diagrammatically two different welding circuits which may vary independently the arcing current and the short circuit current in dependence upon the resistance at the weld.

The circuit shown in FIGURE 3 comprises a variable voltage transformer 20, a rectifier 21 which can be either uncontrolled or controlled, inductor 22, a resistor or impedance 23, and a contactor or controlled rectifier 24. On short circuiting of the electrode wire the contactor 24 closes after a preselected time delay shorting out the impedance 23 and increasing the current flow to the electrode wire. The current may be increased further by increasing the secondary voltage of the transformer, the initial current rise being determined by the circuit inductance. At the end of the short circuit period (when the electrode melts) the contactor opens and the current during the following arcing period is controlled by the voltage of the variable transformer 20. The control circuits are not shown in detail.

The second circuit shown in FIGURE 4 comprises a variable voltage transformer 30 with two secondary windings 33 and 35. Current during the arcing period is supplied from winding 35 and rectifier bridge 36 through variable resistor 37 and variable inductor 32. On short circuiting of the electrode wire the contactor 34 closes after a time delay and a pulse of current is supplied by means of winding 33 and bridge rectifier 31.

In the typical welding cycle shown in FIGURE 2, which may be obtained by using the circuit shown in FIGURES 3 and 4, the arcing current corresponds to curve 18. When a short circuit occurs the current rises along the curve 15 due to the characteristic inductance of the circuit and then, when the contactor switch closes, the current rises rapidly along the curve 16 until the wire melts at 17.

In the circuits of FIGURES 3 and 4 the contactors are shown as mechanical switches but such switches would not act quickly enough for a practical circuit and other devices would be substituted.

Figure 5:
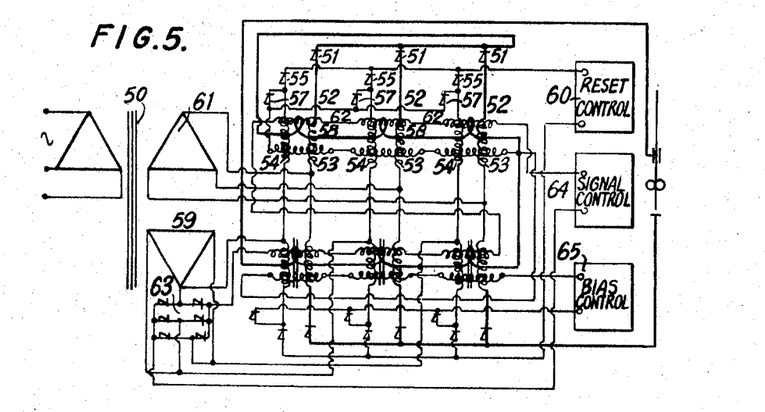
FIGURE 5 is a circuit diagram of a first practical welding circuit.

FIGURE 5 shows one such practical circuit corresponding in performance to the circuit shown in FIGURE 3, where half wave flux reset transductors are used as switches or controllers.

Transformer 50 has secondary windings 59 and 61 and is shown connected three-phase delta although single or other multiphase connections and arrangements may also be used. Rectifiers 51 are shown as three-phase bridge connected. The half-wave flux reset transductors 52 each comprise a load winding 53, a reset winding 54 connected to a reset rectifier 55 and a reset resistor 60, a bias winding 56 connected to a bias rectifier 57 and a bias resistor 65, a signal winding 62 connected to a signal rectifier 63 and a signal resistor 64, and a feedback winding 58 from the output of the load winding. The reset windings 54 are supplied from the secondary 59 of the transformer 50 and are in antiphase with the load windings 53. The signal windings 62 are supplied with direct current from an auxiliary winding through a bridge rectifier 63 or as shown from the secondary winding 59 of the main transformer. Adjustment of the signal circuit resistor 64 determines the time delay before rapid rise of current occurs on short circuit. The signal resistor 64, the bias resistor 65 and the reset resistor 60 may be replaced by automatic control circuitry. The bias resistor 65 presets the working point of the transductor by controlling the direct current in the bias windings which in turn determines the operating range on the magnetization curve of the transductor core. An automatic control circuit may be used in its place. In an alternative arrangement to that shown the bias winding 56 is connected to the voltage across the weld through resistor 65 so that during the arcing period very little bias current flows.

The operation of this circuit will now be described.

Referring to FIGURES 2 and 5 the operation will be as follows from the instant of short circuit. (It is assumed that the transductors would be initially dropping nearly maximum volts and therefore only the necessary D.C. voltage would be appearing at the main welding terminals, to maintain a preselected arcing current on welding.)

On short circuit the current will initially increase along line 15 to a value depending on the D.C. voltage and resistance in the circuit, its initial rate of rise during, say, the first 6 milliseconds in the case of a supply frequency of 50 cycles per second, being at an increasing rate, since feedback ampere turns 58 would be causing a small reduction of flux density in the transductor cores of the operating transductors in the two firing arms of the three-phase full wave bridge. The feedback ampere turns oppose the reset ampere turns and are sufficient to reset (to saturate) the transductors in the remaining four arms of the bridge. Accordingly the cores of the transductors which fire in the next two periods of 6 milliseconds are magnetically saturated. Maximum voltage is then available at the welding output and a rapid rise of current would occur as shown by line 16, the rate of rise of current being dependent on the small self inductance remaining in the main welding circuit, such as that of welding cables, and of the transductor main windings 53.

However, if the ratio of bias ampere turns to that of feedback is correctly balanced, the effect of the feedback ampere turns would be small and incremental at the start of short circuit (since bias ampere turns would also be increasing) and an appreciable controlled delay is achieved before the transductor cores are saturated. On this occurrence (i.e., saturation) the current rapidly increases, further increasing the saturation rate, such that on the succeeding 6 milliseconds the current rises very rapidly at a rate dependent on the self-inductance in the main welding circuit (i.e., as seen at 16).

On melting of the wire, an arc will be struck, whose resistance will be much higher than that of the short circuit. The current decays rapidly to a value slightly higher than that of the arcing current, the feedback ampere turns are considerably reduced, increasing the flux density of the cores, such that the reset ampere turns become predominant and in the succeeding 6 milliseconds the transductors drop the selected voltage (selected by reset and bias ampere turns) and the current decays further to the substantially steady preselected arcing current value as indicated by line 18. The arcing current is preselected by the bias and/or signal controls, which determine the level of the steeply rising voltage/current characteristics (which reacts to maintain constant arcing current within certain limits of arc length variation).

A controlled decay curve is also possible, depending on the effect of the decreasing bias ampere turns after the end of short circuit.

Other means of control such as transistor amplifiers may be used in place of the resistors 60, 64 and 65 to provide very fast and independent compensation of the arc voltage and short circuit current under varying welding conditions, which could be caused for example by fluctuations in the mains voltage or variations in the arc length.

An automatic control in the reset control circuit may be substituted for the feedback winding 58 to control the short circuit current independently of the arc voltage.

By connecting the feedback winding 58 to assist the reset ampere turns, the output characteristics take a drooping or a constant current form.

Figure 12:
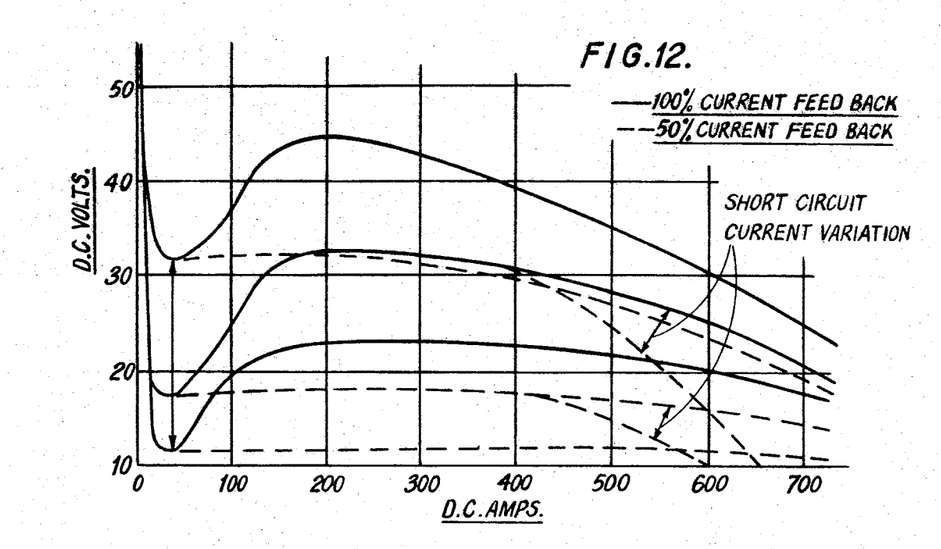
FIGURE 12 shows some typical static voltage current curves for the circuits of FIGURES 5 and 8.
Figure 14:
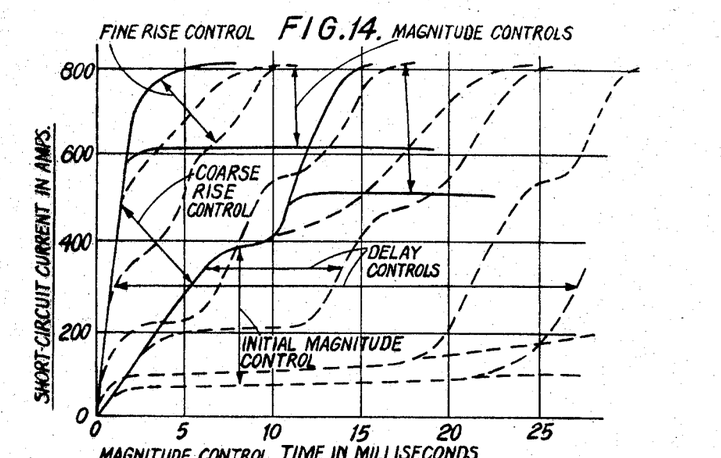
FIGURE 14 shows some typical short circuit current wave shapes for the circuits of FIGURES 5 and 8.

FIGURE 12 shows a typical static voltage current curve for the circuit of FIGURE 5 with a resistance load, and FIGURE 14 shows a typical wave shape for the short circuit current.

Figure 6:
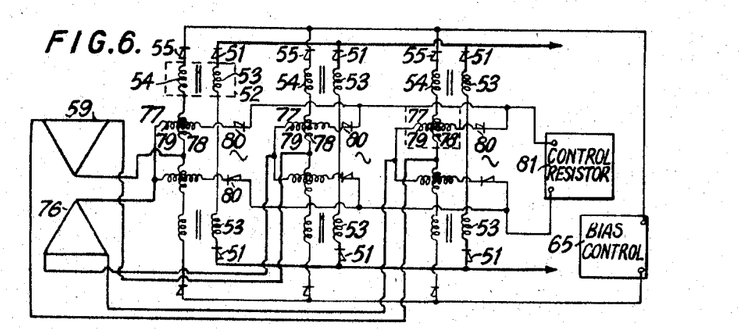
FIGURE 6 shows a modified reset circuit for use in FIGURE 5.

FIGURE 6 shows the reset circuit shown in FIGURE 5 modified to provide increased gain control. This requires the use of autoexcited amplifiers and in the example shown flux reset transductors are used. The amplifying transductors 77 control the reset current in the main transductors 52 and the output welding voltage. The diagram, which shows the reset circuit only, includes amplifiers 77 with auxiliary load windings 78, auxiliary reset windings 79, auxiliary reset rectifiers 80, auxiliary control resistor or external control circuits 81 and an auxiliary reset transformer winding 76. This circuit provides a two stage control and although gain of control is very much increased the response time remains less than one cycle of supply frequency.

The feedback windings 58 of transductors 52 shown in FIGURE 6 may be transposed in amplifiers 77 to provide similar results to the transposing of the windings 58 in FIGURE 5.

The flux density in auxiliary transductors 77 depends on the ampere turns of the reset windings 70 and any other bias winding on these transductors (which are not shown). If the ampere turns of the reset winding 79 are increased, the flux density in auxiliary transductors 77 and the voltage across windings 78 will increase. The main reset current of the main transductors 52 will therefore decrease, hence reducing the flux density on the cores, and increasing the main D.C. output voltage. Transductors 77 shown in the circuit are again of the flux reset type, hence control of main reset current can be achieved within half a cycle and control of the main D.C. output voltage within one cycle.

If main D.C. current feedback were to be taken through the auxiliary transductors 77 instead of through the main transductors 52, and arranged so as to assist the ampere turns of the auxiliary reset windings 79, at the instant of shortcircuit the auxiliary transductors would reduce the main current within 6 milliseconds and increase the main D.C. output current at a rate, depending on the main transductor controlling ampere turns in the next 6 milliseconds.

Figure 7:
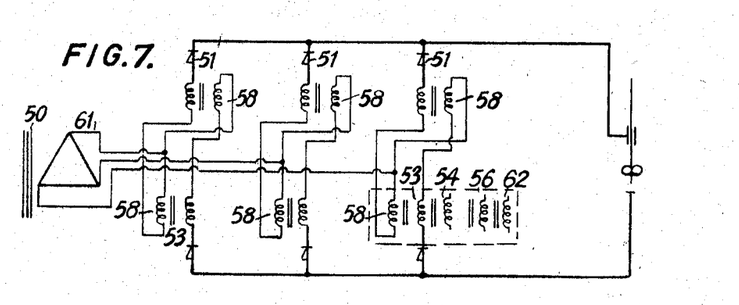
FIGURE 7 shows a modified load circuit for use with the circuit of FIGURE 5.

FIGURE 7 shows an alternative method of connecting the feedback windings 58 of the transductors 52 when using the circuit of FIGURES 5 and 6. At start of short circuit the two "firing" transductors (which have had their flux densities preset for providing the selected arcing current), will allow a small increase of short circuit current which will cause an incremental reduction of flux density, since the feedback ampere turns oppose those of reset ampere turns.

During the first 6 milliseconds the feedback winding is also connected via one of the firing arms to the next fire transductor arm, such that it would saturate this one, and so during the next 6 milliseconds this transductor would drop a minimum voltage, and a rapid rise of current would occur. If desired, delay can still be achieved as previously explained.

Figure 8:
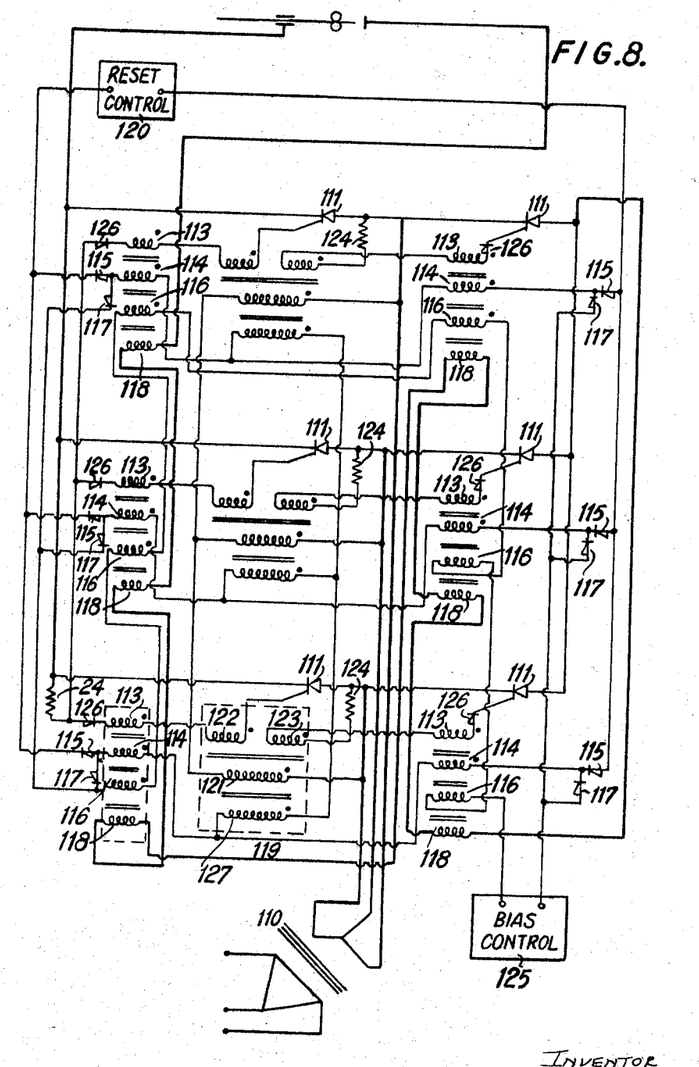
FIGURE 8 shows a circuit diagram of a second practical welding circuit.

FIGURE 8 is a circuit diagram illustrating another practical form of the type of circuit shown in FIGURE 3 whereby the current during the arcing period and the short circuit current magnitude and wave form are independently controlled by one circuit. The circuit comprises a three-phase transformer 110, a three-phase bridge-connected rectifier consisting of three thyristors 111 (controlled rectifiers) in the positive half wave of the bridge and three rectifiers or thyristors 111 in the negative half wave of the bridge.

The principles of phase shifting the firing angles of thyristors to control D.C. voltage are known and the circuit shown in FIGURE 8 is an example of the use of thyristors controlled by phase shift or pulse generator networks. A magnetic phase shift firing circuit comprises small flux reset transductors, the load windings of which operate the controlled rectifiers. External control circuits for the control of welding under changing conditions may be added in the reset and bias circuits.

The circuit consists essentially of main transformer 110, thyristors 111 and flux reset phase shift firing transductors 112. The transductors 112 each comprise a load winding (gate of thyristors) 113, a reset control 114, a bias control 116, and associated rectifiers 126, and resistors 124, 120 and 125 for the respective controls. The firing transductors are supplied from auxiliary transformers 119, each comprising a primary winding 121, a gate winding 123 and a reset winding 127. The primary sides of the auxiliary transformers may be connected to the secondary of the transformer 110 or directly to the mains.

The feedback winding 118 may be replaced by external automatic control such as a transistor amplifier working in the reset load circuit of the firing transductors, such that on the occurrence of short circuiting of the electrode wire the reset current is reduced, thus increasing the firing angle of the thyristors and increasing the short circuit current. The bias resistor 125 and the reset control resistor 120 may be replaced by external automatic control to compensate for welding or mains fluctuations.

Figure 9:
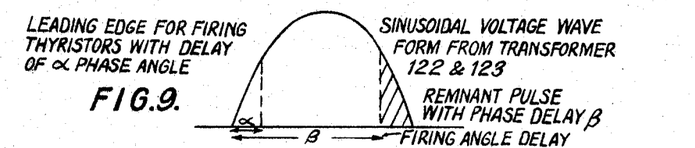
FIGURE 9 shows diagrammatically the output voltage waveform of a thyristor circuit with a given input firing angle.

The operation of the controlling flux reset transductors 112 is in accordance with similar principles to that described previously. The transductor load windings 113 operate the gates of the silicon controlled rectifiers (thyristors), the current through the gates being limited by resistors 124. The output waveform of the gate windings 113 is much as shown in FIGURE 9.

Maximum flux density in the transductor is chosen to correspond to angle $\beta$, which means that the thyristors' firing will be delayed corresponding to a minimum D.C. output voltage. Minimum flux density in the transductors is chosen to correspond to angle α. Thus the thyristors' firing angle is fully advanced, corresponding to maximum output D.C. voltage.

Therefore, operation on arcing and short circuit will be controlled by these transductors, which in turn control the thyristors' firing angles and therefore main output D.C. arcing voltage and short circuit current, as previously described.

Figure 10:
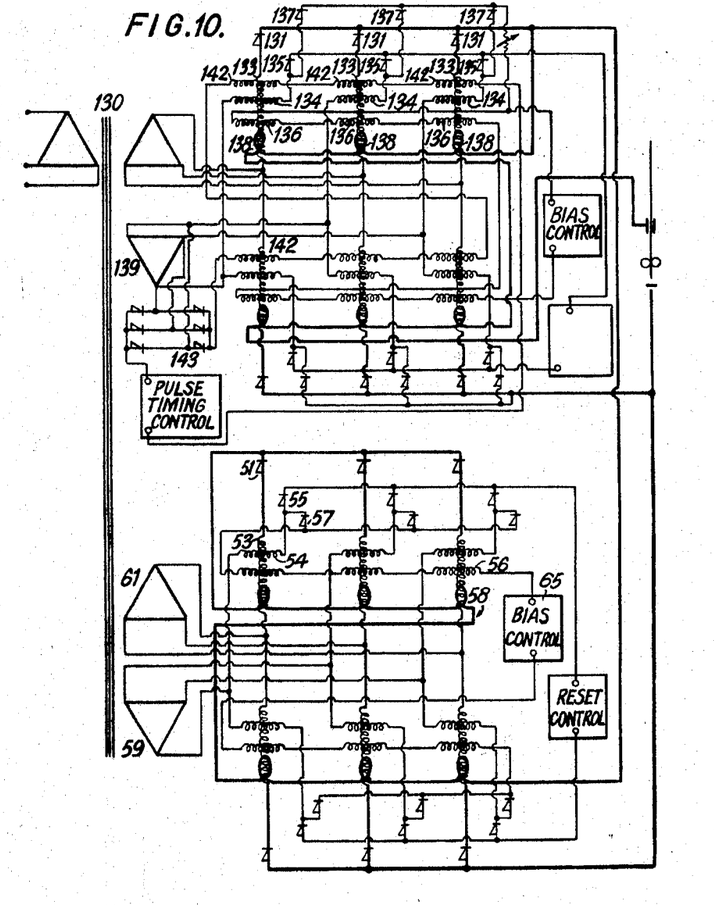
FIGURE 10 shows a third practical welding circuit diagram.

FIGURE 10 is a practical circuit working on the principle shown in FIGURE 4 and shows a parallel two-circuit arrangement, but a series connected two-circuit arrangement may also be used. This circuit provides independent control of (a) current during arcing, (b) short circuit current, (c) the time at which the current pulse is applied, (d) the initial rate of rise of current on short circuit, and (e) the wave form and magnitude of the current pulse. The pulse current circuit 128 operates similarly to the circuit described and illustrated in FIGURE 5. The circuits may be of single or multiphase connection but the pulse unit feedback winding 138 is connected in the total current path, such that the pulse current wave shape may be determined wholly or partially by the total short circuit current. The pulse current is inoperative or almost inoperative during the arcing period because the transductors 132 drop the maximum voltage during this period. Control of the time at which the pulse current occurs is obtained by the control windings 142 through rectifiers 143 and rheostat 144 with a response time of the order of milliseconds. Rheostat 144 may be replaced by automatic control circuitry to provide automatic control of time of pulsing. The bias winding 136 may be connected across the output voltage through resistor 145 as shown, so that during the arcing period very little bias current flows, thus further limiting the output voltage from the pulse current circuit during the arcing period, whereas on short circuit of the electrode wire the bias increases and further assists in reducing the response time since the circuit is self-compensating in that increase of bias current decreases the effective reset ampere turns, so that the effect is cumulative.

Figure 15:
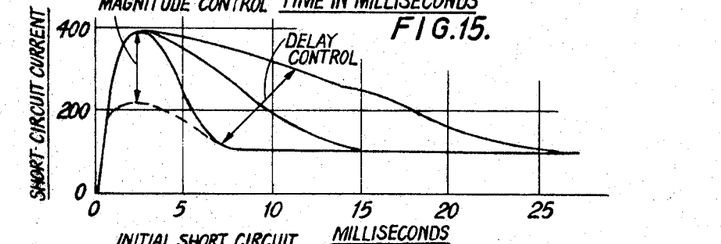
FIGURE 15 shows some typical short circuit current wave shapes for the arcing unit of FIGURE 10.

A typical short circuit current wave shape for this unit is shown in FIGURE 15.

The circuit 129 providing the current during the arcing period also supplies the initial current and wave shape on short circuit of the electrode wire. The static output characteristics of this particular circuit are considered to be best when they are of the drooping or constant current type, in that a high voltage is attained on open circuit, the voltage remaining constant or drooping slightly to a preselected value and then decaying to the arc voltage required for the pre-selected constant current.

The arcing current circuit may have various forms and different methods of control. The examples shown in FIGURE 10 utilizes a circuit similar to the pulse current circuit, but with a much higher open circuit output voltage. The constant current characteristic is obtained with the feedback winding connected so that it assists the reset ampere turns when there is current flow during the arcing period. During the first half cycle of supply frequency it may supply a boost of controlled short circuit current of a magnitude proportional to the arc currents selected, such that the combination of the circuits providing the current during the arcing period and the pulsed current respectively provide a controlled sequence of current wave forms for the welding droplet rate and weld penetration required. The main and auxiliary windings of the circuits providing the pulse current and current during the arcing period may be supplied from the same transformer.

Figure 11:
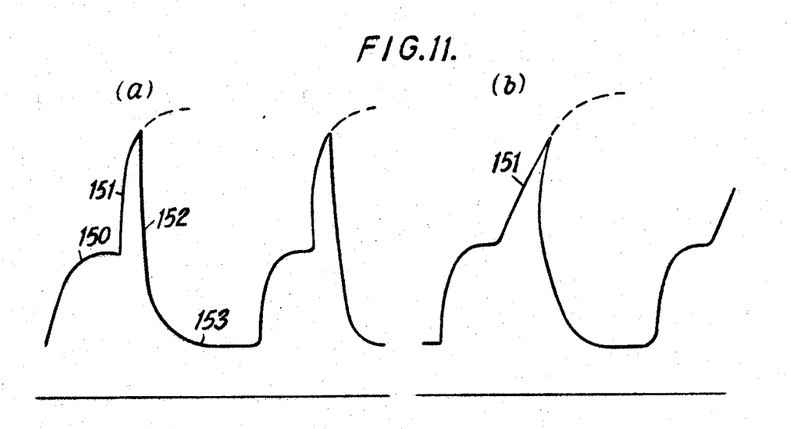
FIGURE 11 shows a current-time curve for a welding cycle using the circuit of FIGURE 10.

The operation of the circuit of FIGURE 10 will now be described with reference to FIGURE 11.

The voltage is initially at a set value at the instant of short circuit, dependent on the setting of the bias control. The current will initially rise along the curve 150 until the pulsing unit 128 takes control. The current then rises along curve 151 towards a limiting value at a very fast rate, limited only by the inductance of the circuit. When the wire melts the current decreases in increments as the feedback winding tries to increase flux density in the firing cores, hence reducing output current during the first 6 milliseconds, whereupon in the next 6 milliseconds the current decays very rapidly along the curve 152, of which the slope is dependent on the ratio between the biasing and the feedback ampere turns, which oppose each other, until the preselected arcing current 153 is achieved. This has the effect of a controlled "boost" of current during each short circuit.

Figure 13:
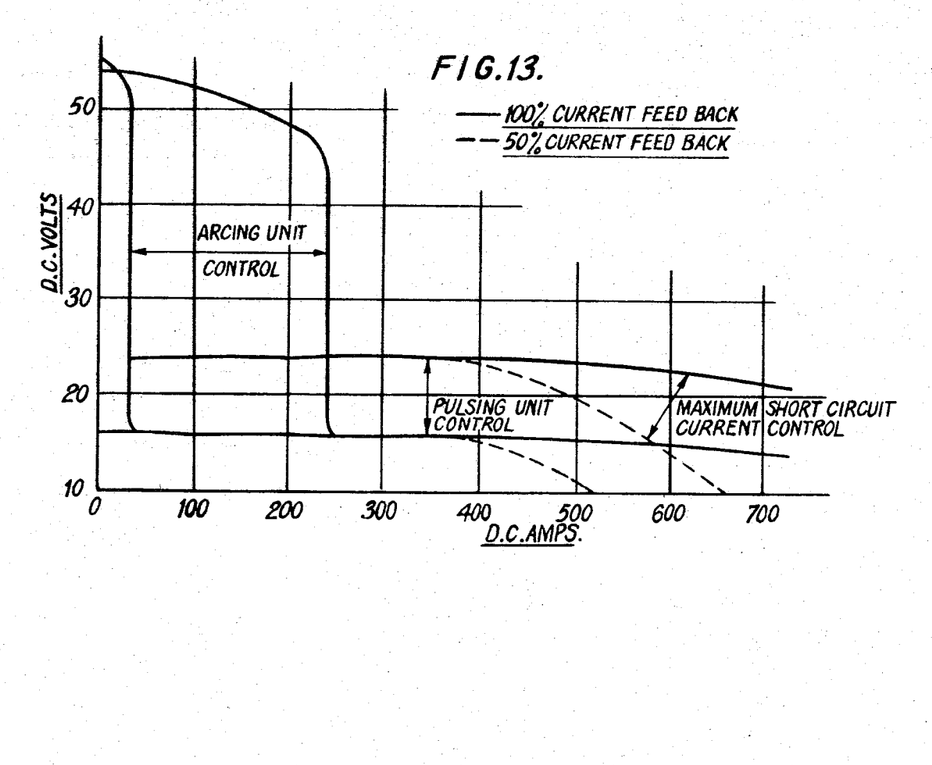
FIGURE 13 shows some typical static voltage current curves for the circuit of FIGURE 10.

The arcing unit would then supply most of the arcing current and maintain it substantially constant, independent of variations of arc length, arc resistance, etc., as can be seen from the static voltage-current characteristic diagram (FIGURE 13). This shows that on open circuit a fixed high value of voltage is available for arc reignition, whereupon on increase of current the voltage decreases at an increasing rate and until nearly constant current characteristics are achieved at the value of current selected, for wide variations of load resistance right down to very small resistance in the circuit. The constant current can be selected over a fairly wide range by the reset control and/or bias control setting.

The total static voltage-current characteristics of the circuit in FIGURE 10 is the sum of the pulsing and arcing unit characteristics and are shown in FIGURE 13.

Figure 16:
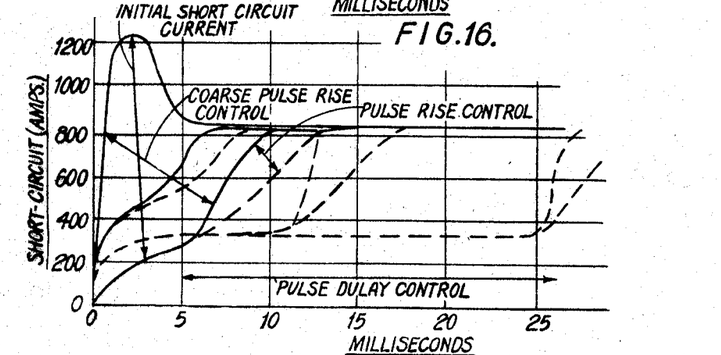
FIGURE 16 shows some typical short circuit current wave shapes for the circuit of FIGURE 10.
Figure 17:
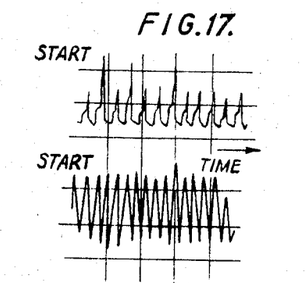
FIGURE 17 shows two typical high-speed traces of welding cycles using the circuit of FIGURES 5 and 8, and FIGURES 18 and 19 show two typical high-speed traces using the circuit of FIGURE 10, each figure showing the output of the arcing unit, the output of the pulsing unit and the total output of the circuit.
Figure 18:
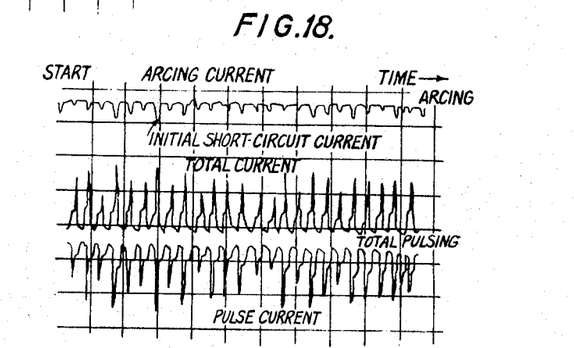
Figure 19:
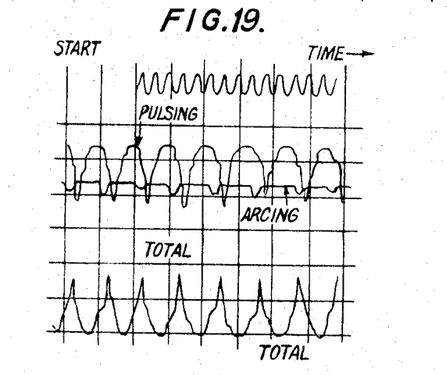

A high arc reignition voltage is attained, which upon increase of current up to the value preselected for arcing will decrease very sharply at a constant current rate, until a certain load resistance is reached, setting of which is determined on the pulsing unit (by its reset resistor 140) whereupon constant voltage characteristics are obtained down to a controlled short circuit current. A typical waveshape for this short circuit current is shown in FIGURE 16.

The constant voltage portion is maintained for a much bigger value of load current than would be possible with a conventional constant potential power source, und typical figures are given as follows.

For 16 volt open circuit setting: Dual circuit power source gives up to 1,200 a. short circuit on welding (this value being dependent on the maximum voltage of the power source) and larger currents at the expense of response of rapid current pulsing increase can also be provided. For constant potential power sources the maximum short circuit current would be in the region of 300–400 a. on welding.

The apparatus according to this invention enables the droplet rate of frequency of dip transfer for a given rate of feed of electrode wire to be controlled by one or a combination of the following:

(a) Varying the current during the arcing period, that is the current between repetitive short circuits of the electrode wire, independently of the short circuit current, the rise time of the short circuit current remaining substantially constant.

(b) Varying the magnitude of the short circuit current independently of the rise time of the short circuit current, the current during the arcing period remaining constant.

(c) Varying the time of occurrence, duration, and wave shape of the short circuit current. Various wave shapes may be used, the preferred forms being—
   (i) An initially controlled current rise followed after a predetermined time by an injected current pulse of selected magnitude and wave shape.
   (ii) An initially controlled current rise followed after a predetermined interval of time by a very rapid rate of current rise.

Although only a short circuiting arc welding method has been described, it is possible to operate any of the power sources shown in FIGURES 5 to 8 and 10 in the open arc or spray transfer region.

As such, due to the half cycle control possibilities, the arcing voltage and hence the arcing current can be either oscillated, regularly pulsed sinusoidally or in square wave fashion, or pulsed by external control means to achieve control of welding in the spray transfer region, or the short circuiting spray transfer regions.

This would entail control circuits in addition to those shown, but the basic unit would remain the same.

The arcing unit 129 shown in FIGURE 10 has the properties of being able to produce a controlled half cycle "boost" of current which would assist in melting of the electrode wire as well as as a constant current (or steeply drooping) characteristic and may be utilized on its own for say "manual metal arc" electrode welding.

The circuits described in FIGURES 5 to 8 and 10 are suitable for a multipurpose arc welding machine since:

(a) Pulsing of current is possible, as described.
(b) Rising current characteristics are possible, as described.
(c) Constant potential characteristics are possible as shown.
(d) A controlled static voltage-current slope is possible if the feedback winding is disconnected.
(e) Drooping characteristics are possible if the feedback winding is reversed, as described.

I claim:
1. Dip transfer welding apparatus comprising; a welding current source, a welding head fed with current from said welding current source, control means responsive to the occurrence of a short circuit at said welding head, timing means, and means controlled by said control means and said timing means to reduce the impedance of said current source during a period of short circuit current at said welding head at a preselected time after the occurence of short circuit current.

2. Dip transfer welding apparatus comprising; a welding current source, a welding head, at least one flux reset transductor, said flux reset transductor having a load winding fed with current from said welding current source and connected to feed current to said welding head, a feedback winding wound on the transductor core to reduce the flux density in the transductor core in accordance with the magnitude of current through said welding head, and adjustable means for biasing the transductor flux density so that maximum current output from said load winding occurs at a variable time after the occurrence of short circuit of said welding head.

3. Dip transfer welding apparatus comprising; a welding current source, a welding head, a polyphase current source, a plurality of bridge connected flux reset transductors, each pair of transductors having load windings fed from alternate polarities from a phase of said polyphase current source, a feedback winding on each transductor core, each feedback winding being wound on a respective transductor core to reduce the flux density in that transductor core in accordance with the magnitude of current through said welding head, adjustable means for biasing the transductor cores so that maximum current output from said load windings occurs at a selected time after the occurrence of a short circuit at said welding head, said load windings controlling the instantaneous current through said welding head.

4. Dip transfer welding apparatus as claimed in claim 3 wherein said load windings are connected in series with said welding head.

5. Dip transfer welding apparatus as claimed in claim 3, wherein controlled rectifiers are connected between said welding current source and said welding head, each load winding being connected to the control electrode of a respective controlled rectifier.

6. Dip transfer welding apparatus comprising; a welding head, a polyphase current source, a plurality of bridge connected flux reset transductors, each pair of transductors having load windings fed with current of alternate polarities from a phase of said polyphase current source, a feedback winding on each transductor core, each feedback winding being wound on a transductor core to reduce the flux density in that transductor core in accordance with the magnitude of current through said welding head, adjustable means for biasing the transductor cores so that maximum current output from said load windings occurs at a selected time after the occurrence of short circuit at said welding head, said load windings being connected in series with said welding head, a further current source, said further current source being connected in series with said welding head and in parallel with said load windings.

7. Dip transfer welding apparatus as claimed in claim 6 wherein said feedback windings are connected in series with themselves and with said welding head.

8. Dip transfer welding apparatus as claimed in claim 6 wherein said additional current source includes a polyphase current source, an additional plurality of bridge connected flux transductors, each pair of the additional transductors having load windings fed with current of alternate polarities from a phase of said additional polyphase current source, the load windings of each additional transductor supplying said welding head with current, said transductors having means for biasing the transductor cores to give a constant current output.

References Cited

UNITED STATES PATENTS

| | | | |
|---|---|---|---|
| 2,798,934 | 7/1957 | Brand | 219—131 X |
| 3,087,044 | 4/1963 | Inoue | 219—130 X |
| 3,287,625 | 11/1966 | Malatier et al. | 219—135 X |

RICHARD M. WOOD, *Primary Examiner.*

J. GREGORY SMITH, *Assistant Examiner.*